United States Patent [19]

Nunlist

[11] Patent Number: 4,761,025
[45] Date of Patent: Aug. 2, 1988

[54] METHOD AND APPARATUS FOR DISTRIBUTING THE LOAD BETWEEN SECTIONS OF A VERTICAL COLUMN

[75] Inventor: Erwin J. Nunlist, Penfield, N.Y.

[73] Assignee: Kennecott Corporation, Cleveland, Ohio

[21] Appl. No.: 83,704

[22] Filed: Aug. 7, 1987

Related U.S. Application Data

[63] Continuation of Ser. No. 668,588, Nov. 5, 1984, abandoned.

[51] Int. Cl.$^4$ ............................................. F16L 13/04
[52] U.S. Cl. ................................. 285/114; 285/363; 285/55
[58] Field of Search ................. 285/114, 55, 115, 363, 285/364, 368, 406, 412, 416, 420, 334.5, DIG. 12, 414

[56] References Cited

U.S. PATENT DOCUMENTS

| | | | |
|---|---|---|---|
| 283,072 | 8/1883 | Camp | 285/420 |
| 570,170 | 10/1896 | Greenfield | 285/55 |
| 580,607 | 4/1897 | Thomine | 285/368 |
| 821,537 | 5/1906 | Price | 285/413 |
| 2,294,806 | 9/1942 | Samans | 285/363 |
| 2,568,414 | 9/1951 | Russ | 285/414 |
| 2,568,923 | 9/1951 | McNeary et al. | 285/114 X |
| 2,738,993 | 3/1956 | Wilson | 285/414 |
| 3,189,371 | 6/1965 | Swan | 285/416 |
| 3,455,583 | 7/1965 | Ray | 285/414 |
| 3,615,984 | 4/1968 | Chase | 285/55 |
| 4,281,859 | 8/1981 | Davies | 285/416 |
| 4,311,505 | 1/1982 | Yasui et al. | 285/55 |
| 4,466,641 | 8/1984 | Heilman et al. | 285/406 |
| 4,475,749 | 10/1984 | Pforr et al. | 285/DIG. 12 |
| 4,484,771 | 11/1984 | Schulz | 285/413 |
| 4,487,438 | 12/1984 | Sweeney | 285/416 |

FOREIGN PATENT DOCUMENTS

| | | | |
|---|---|---|---|
| 233195 | 1/1960 | Australia | 285/368 |
| 24242 | 1/1883 | Fed. Rep. of Germany | 285/363 |
| 951281 | 10/1956 | Fed. Rep. of Germany | 285/363 |
| 2838514 | 3/1980 | Fed. Rep. of Germany | 285/416 |
| 955913 | 1/1950 | France | 285/416 |
| 3420 | of 1872 | United Kingdom | 285/363 |
| 315614 | 7/1929 | United Kingdom | 285/412 |
| 583348 | 12/1977 | U.S.S.R. | 285/368 |
| 844895 | 7/1981 | U.S.S.R. | 285/368 |

Primary Examiner—Dave W. Arola
Attorney, Agent, or Firm—Donald C. Studley; Michael L. Dunn

[57] ABSTRACT

The present invention relates to a method and apparatus for sharing a load between individual sections of a vertical column. Although particularly useful in conjunction with glass lined steel columns, the present load distribution means is also useful in other vertical columns which are assembled in sections and have gasketed joints. The load sharing, or distribution, means comprises a radially extending annular member, rigidly secured along the outer periphery of each column section to be joined. The annular member is positioned adjacent to the section end. The annular members are aligned as the column sections are assembled and are spacedly secured one from another. Thus, the annular member on one section is secured, but at a distance, from the annular member on an adjacent section.

7 Claims, 1 Drawing Sheet

METHOD AND APPARATUS FOR DISTRIBUTING THE LOAD BETWEEN SECTIONS OF A VERTICAL COLUMN

This is a continuation of Ser. No. 668,588, filed Nov. 5, 1984 and now abandoned.

BACKGROUND OF THE INVENTION

The present invention relates to glass or enamel lined columns or towers. Glass lined metal, particularly ferrous metal, steel, columns comprised of a plurality of individual sections, are subject to leakage at the gasketed junction of the column sections. Such leakage is caused by failure of the gasket, usually by an overloading of the gasketed joint. The present invention seeks to minimize, or eliminate, such overloading by providing a load sharing, or load distributing means, around the junction of the column sections.

Glass lined columns have found widespread use in numerous industries, particularly in those industries which utilize extraction, separation or distillation processes. The glass lining facilitates the use of such columns under severe adverse temperature and corrosion conditions. Such columns may be operated at atmospheric pressure, under a vacuum, or at pressures up to and exceeding 100 psi. Columns are typically comprised of a plurality of individual column sections. The sections are incrementally assembled facilitating the placement and arrangement of trays within the column as it is being assembled. If the column is to be packed, the packing is suitably placed in each section as it is assembled. Typically, the column sections have flanged ends and are separated at the flange interface by a resilient gasket. The gasket typically is fabricated of a plastic, e.g. fluorinated polymer, and includes layers of asbestos or corrugated stainless steel. The sections are placed together and the gasket compressed by means of clamps positioned around the outside circumference of the flanges. The objective is to obtain a leak-proof joint between the column sections.

The column sections may be assembled at the place of manufacture, or may be shipped in sections to the point of use and assembled in situ. Two methods are typically used. In one, the column is assembled on the ground, that is horizontally, and subsequently the assembled column raised to a vertical position. In the other method, the column sections are stacked, one by one, vertically until the column is complete.

When the horizontal assembly method is utilized, the final raising of the column places severe pressure and strain on the gasketed joints because the lifting, even carefully done, causes bending along the column length. As a result, the gaskets frequently become overloaded and present a leakage problem. Overloading is caused by the gasket being temporarily compressed so much that it loses its resiliency. When the overload is removed the gasket fails to take up the space at the junction of the column sections and results in leakage. This situation can be especially aggravating after pressure testing on the ground has shown no leakage.

When the column sections are stacked, the weight of each section bears upon the section or sections below. As the column height increases, the joint loading increases. If the column contains trays or is packed, the gasket loadings further increase. Typically, the weight of the column increases about in ratio of the square of the diameter.

In tall columns, other factors may contribute to overloading of the gasketed joints, for example, wind or sway that may cause the column to rock, or guy wires or cables that may be unintentionally over-tightened.

BRIEF DESCRIPTION OF THE INVENTION

The present invention provides a method and apparatus for sharing a load between individual sections of a vertical column. Although particularly useful in conjunction with glass lined steel columns, the present load distribution means is also useful in other vertical columns with linings which are assembled in sections and have gasketed joints. The load sharing, or distribution, means comprises a radially extending annular member, rigidly secured along the outer periphery of each column section to be joined. The annular member is positioned adjacent each flanged end. The annular members are aligned as the column sections are assembled and are spacedly secured one from another. Thus, the annular member on one section is secured, but at a distance, from the annular member on an adjacent section.

In a preferred embodiment, the annular member is extended and generally flared outward at the column section end to form a skirt, or bell flange. To facilitate ease of connection, the edge of the skirt is preferably equipped with an annular face plate, or ring bar. The face plates on each of the column sections are adapted to be spacedly secured a desired distance one from another. The angle at which the skirt is outwardly tapered, or flared, from the column section side is preferably less than about 60°. Usually angles greater than about 60° are not utilized because an undesired bending movement is generated along the junction of the skirt and the column side. The distance the skirt extends outward from the section end generally depends upon the column size and the flare of the skirt, however, distances of between about two and about six inches are typically used. The annular face plate has openings adapted to receive spacing and fastening means, such as bolts or threaded rods therethrough. In use, the gasketed column sections are aligned and clamped to seal the joint. The openings in the annular face plates are aligned and a spacing and fastening means inserted therethrough. Suitably, the spacing and fastening means are threaded rods and nuts. In this arrangement, nuts are threaded on the rods and butted to the face of the bar rings closest to the section end, thus the annular face plates are maintained in spaced relation to each other. Nuts are then secured to the ends of the threaded rods extending through the annular face plates securing the face plates (and column sections) in a spaced relation to each other. This arrangement provides a means of alleviating superimposed pressure on the gasketed joints by distributing the weight load around the joints by the formation of a span over each junction and thereby distributing a substantial amount of the loading to the column body.

DETAILED DESCRIPTION OF THE INVENTION

The invention will now be described in detail by reference to the accompanying drawings in which a preferred embodiment of the invention is shown. Similar components are identified by similar numbers in each of the views.

Figure 1:
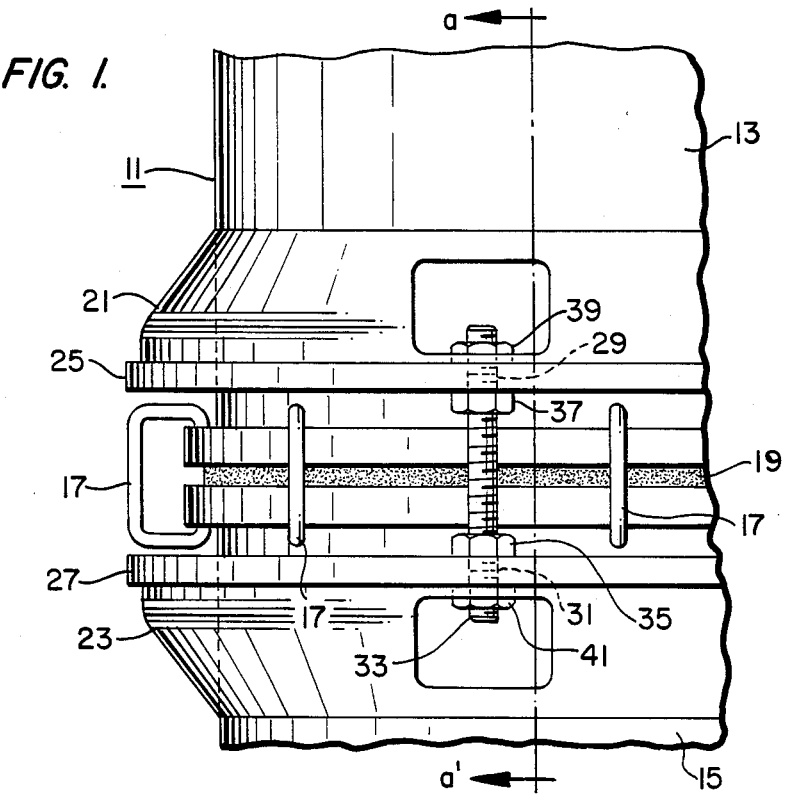
FIG. 1 is a front elevational view of a portion of a column showing the present load sharing means bridging the junction of the two column sections.
Figure 2:
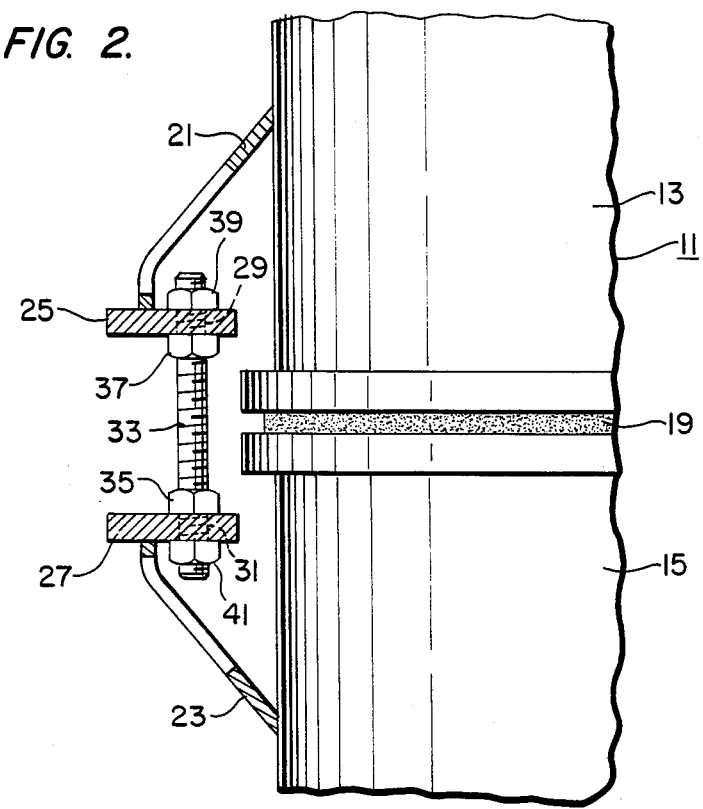
FIG. 2 is a side elevational view, partly in sections, taken along a and a' of FIG. 1 of the load sharing means.

Looking now at FIGS. 1 and 2 in detail, a column or tower generally indicated as 11 is comprised of a plurality of sections that are partially shown as 13 and 15. In a particularly useful embodiment, the sections are fabricated of steel, or other ferrous material, and are glass or enamel lined. The sections are joined together by a plurality of securing means such as "C" clamps 17. Gasket 19, suitably fabricated of an inert resilient material, is positioned in the innerface, or joint, between the sections and is secured in place under pressure by clamps 17. Each of the sections has a load distribution member such as annular members 21 and 23 which angle outward from the wall of sections 13 and 15 and away from the end of each section. Annular members or skirts 21 and 23 have annular face plates 25 and 27 attached at their bell ends. Annular face plates 25 and 27 have openings therein such as 29 and 31 to receive a plurality of fastening and spacing means positioned around the periphery of the face plate. Suitably, the fastening and spacing means are comprised of a threaded rod such as 33 and nuts such as 35, 37, 39, and 41. Threaded bar 33 is inserted through annular face plates 25 and 27. Inside nuts 35 and 37, that is, those closest to the section ends, are secured against annular face plates 25 and 27. Thus, plates 25 and 27 and in turn sections 13 and 15 of the column are maintained in spaced relation. Nuts such as 39 and 41 are secured to the ends of threaded rod 33 thereby maintaining the spaced relationship between sections 13 and 15 of column 11. It is also to be noted that the invention as shown allows visual inspection of the gasketed joint in the assembled column.

In operation, the sections such as 13 and 15 are assembled, gasket 19 positioned, and clamps 17 tightened to obtain a leakproof connection. Threaded rods such as 33 are then inserted through the annular face plates such as 25 and 27 and the inside nuts, such as 35 and 37, tightened or snugged to maintain a desired spacing. Subsequently, outside nuts such as 39 and 41 are secured. The result is a rigid column and one in which a substantial amount of the load, normally on the gasketed joints, is distributed directly to the sides of the column section.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. A load sharing means for distributing the weight load in a cylindrical vertical column having a plurality of sections each having side portions and end portions comprising:

(a) a rigid radially extending annular member rigidly attached to the side portions of each section to be joined, said members positioned adjacent the end portion of each section to be joined;
   (b) a sealing gasket positioned between the end portions of said adjacent sections;
   (c) a clamping means contacting said adjacent sections urging said end portions into sealing engagement with said gasket;
   (d) means, independent of said clamping means, to rigidly secure and maintain the annular member on an end of one section in a desired spaced relation to the annular member on an adjacent section, whereby a rigid span is formed around the juncture of the sections thereby holding said sections in a fixed, spaced, relation to each other, thereby distributing the weight load from the gasketed juncture of the sections to the side portions of the column body.

2. The load sharing means of claim 1 wherein said means to maintain the said annular member in a spaced relation is a threaded connection.

3. The load sharing means of claim 1 wherein the annular members are flared outward and extend from about two to about six inches radially from the end portion of each section to be joined.

4. The load sharing means of claim 1 wherein the annular members have annular face plates and the means to rigidly secure and maintain a spaced relation is secured to said annular face plate.

5. The load sharing means of claim 1 wherein the annular members have annular face plates positioned on their outer edges and said adjustable means joining together said annular members comprise a purality of threaded rods and nuts, each of said rods passing through adjacent face plates and having a pair of nuts thereon in contact with said face plates for driving said annular members toward each other and a second pair of nuts thereon arranged as stop means to maintain the desired spaced relation between said adjacent sections.

6. A method of distributing the weight load between sections of a vertical column having side portions and end portions comprising the steps of:

(a) rigidly securing radially extending annular members adjacent to the end of each column section to be joined;
   (b) aligning said column sections and securing said sections in leak-proof relation to each other; and
   (c) forming a rigid span across and over the junctions of said sections by rigidly securing said annular members on adjacent sections to each other thereby maintaining a rigid secure, spaced relation between sections whereby the weight load is distributed from the gasketed juncture of the sections to the side portions of the column body.

7. The method of claim 6 wherein the spaced relation between sections is maintained by adjusting a threaded connection.

* * * * *